United States Patent [19]

Kohri

[11] Patent Number: 4,638,385
[45] Date of Patent: Jan. 20, 1987

[54] TAPE RECORDER HAVING AN IMPROVED SYSTEM FOR CONTROLLING TAPE TRAVEL AND MAGNETIC HEAD MOVEMENT

[75] Inventor: Naomichi Kohri, Maebashi, Japan

[73] Assignee: Victor Company of Japan, Ltd., Yokohama, Japan

[21] Appl. No.: 610,247

[22] Filed: May 14, 1984

[30] Foreign Application Priority Data

May 18, 1983 [JP] Japan .................................. 58-87364

[51] Int. Cl.⁴ .......................... G11B 5/008; G11B 5/54; G11B 21/22; G11B 21/08
[52] U.S. Cl. .................................. 360/96.4; 360/105; 360/106
[58] Field of Search .................... 360/96.2, 96.3, 96.4, 360/105, 106; 242/197, 198, 199

[56] References Cited

U.S. PATENT DOCUMENTS

| 4,442,467 | 4/1984 | Ikedo | 360/105 |
| 4,532,565 | 7/1985 | Tomita | 360/106 |
| 4,542,430 | 9/1985 | Tomita et al. | 360/106 |

FOREIGN PATENT DOCUMENTS

| 3226712 | 7/1982 | Fed. Rep. of Germany. | |
| 55-4765 | 1/1980 | Japan | 360/96.4 |
| 2072923 | 10/1981 | United Kingdom | 360/105 |

Primary Examiner—Robert S. Tupper
Assistant Examiner—Melissa J. Koval
Attorney, Agent, or Firm—Ladas & Parry

[57] ABSTRACT

A tape recorder of the type in which the tape traveling direction is reversible, comprises first and second pinch roller mechanisms for respectively moving a tape of a tape cassette in forward and reverse directions, a head mechanism for rotating a magnetic head over a one-half revolution to change the position of a head element responsive to the tape traveling direction, a driving mechanism for selectively rotating supply and take-up reel shafts responsive to the tape traveling direction, and a control mechanism for controlling the head mechanism. The control mechanism comprises a first rotary lever for operating the head mechanism, a second rotary lever for controlling the two pinch roller mechanisms relatedly with the driving mechanism, a resilient member for coupling the first and second rotary levers so that they are unitarily and independently rotatable, and first and second rotating mechanisms for respectively rotating the first and second rotary levers. While the first rotating mechanism operates, the first and second rotary levers rotate unitarily, and the tape recorder assumes a forward or reverse reproduction mode. While the second rotating mechanism operates, the first and second rotary levers rotate independently, and the tape recorder assumes a pause mode, for example.

9 Claims, 6 Drawing Figures

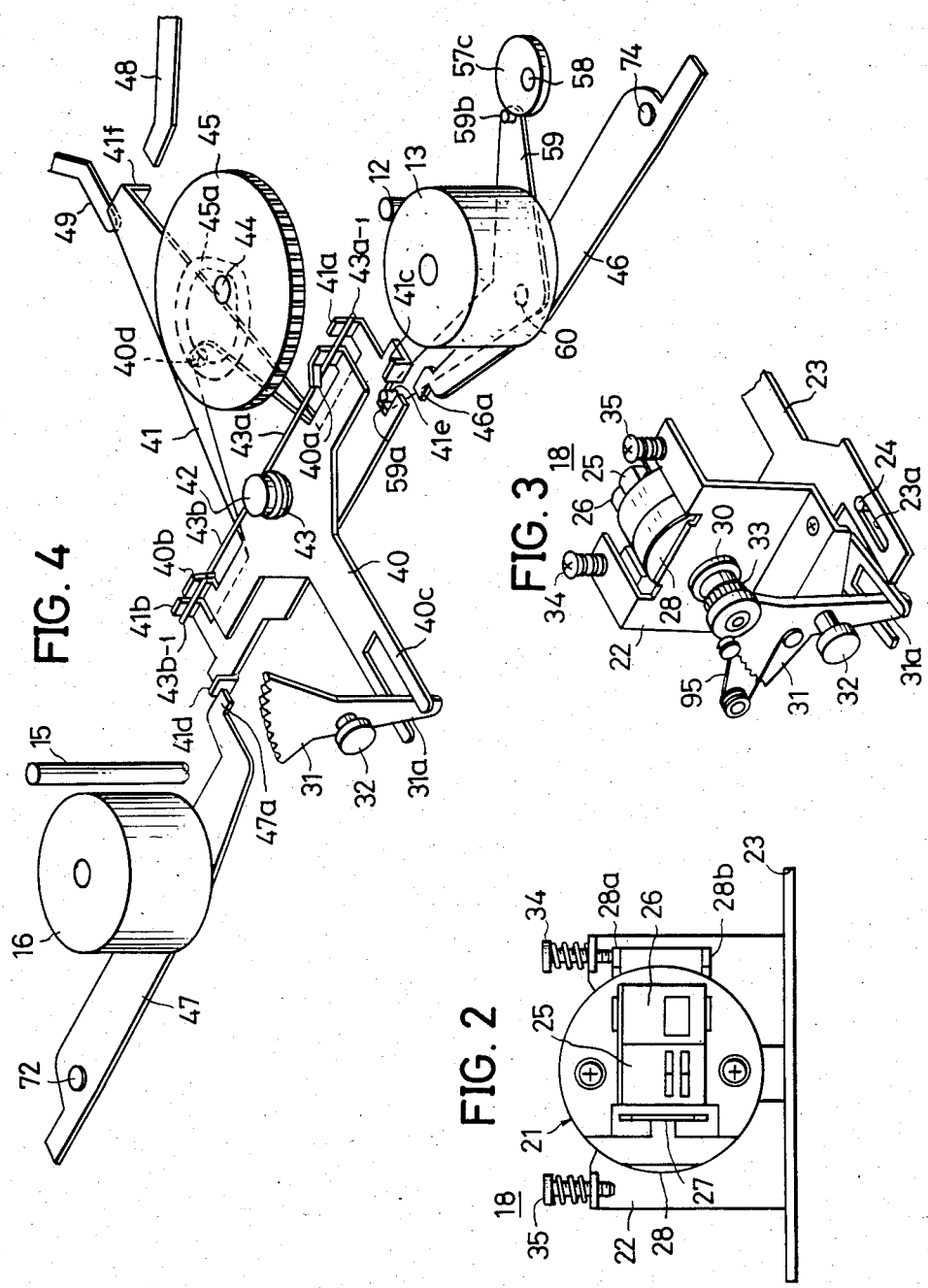

TAPE RECORDER HAVING AN IMPROVED SYSTEM FOR CONTROLLING TAPE TRAVEL AND MAGNETIC HEAD MOVEMENT

BACKGROUND OF THE INVENTION

The present invention generally relates to tape recorders of the type in which the tape traveling direction is reversible, and more particularly to a tape recorder in which the tape traveling direction is reversible and recording and reproduction can be carried out while a tape travels in a forward direction and also while the tape travels in a reverse direction, by causing a magnetic head to undergo a one-half revolution.

In a tape recorder of the type in which the tape traveling direction is reversible, it is necessary to switch over the operating states of pinch roller mechanisms which are respectively disposed on the right and left sides of a magnetic head, when changing the mode of the tape recorder. Further, it is necessary to provide a mechanism for causing the magnetic head to undergo a one-half revolution. As is well known, the magnetic head enters into a central window of a tape cassette which is loaded into the tape recorder, so as to make contact with a magnetic tape accommodated within the tape cassette, depending on the mode of the tape recorder. In the conventional tape recorder of this type, a control system for controlling the tape travel and a control system for controlling the one-half revolution of the magnetic head were completely independent systems. For this reason, a large number of parts were required because of the provision of the independent systems, and a plurality of motors were required to drive the independent systems. As a result, the construction of the tape recorder became complex, and troublesome assembling operations had to be performed to assemble the tape recorder. Therefore, the manufacturing cost of the tape recorder accordingly became high.

SUMMARY OF THE INVENTION

Accordingly, it is a general object of the present invention to provide a novel and useful tape recorder of the type in which the tape traveling direction is reversible, wherein the problems described heretofore have been eliminated.

Another and more specific object of the present invention is to provide a tape recorder of the type in which the tape traveling direction is reversible, wherein a first rotary lever for causing a magnetic head to undergo a one-half revolution and a second rotary lever for controlling the operations of right and left pinch roller mechanisms are coupled through a resilient member, so that the second rotary lever can normally rotate unitarily with the first rotary lever and so that the second rotary lever can rotate independently of the first rotary lever in a special case. According to the tape recorder of the present invention, the second rotary lever rotates by following the rotation of the first rotary lever. Thus, the construction of the tape recorder can be simplified compared to a case where the first and second rotary levers are designed to rotate independently. In addition, it is possible to accurately operate a magnetic head mechanism in relation to the pinch roller mechanisms. Moreover, it is possible to operate the pinch roller mechanisms independently, because the second rotary lever can rotate independently of the first rotary lever.

Other objects and further features of the present invention will be apparent from the following detailed description when read in conjunction with the accompanying drawings.

BRIEF DESCRIPTION OF THE DRAWINGS

FIGS. 2 and 3 respectively are a front view and a perspective view from a rear showing a magnetic head assembly in the tape recorder shown in FIG. 1;

FIG. 4 is a perspective view showing a magnetic head rotating lever, a tape driving system controlling lever, and their related mechanisms.

DETAILED DESCRIPTION

Figure 1:
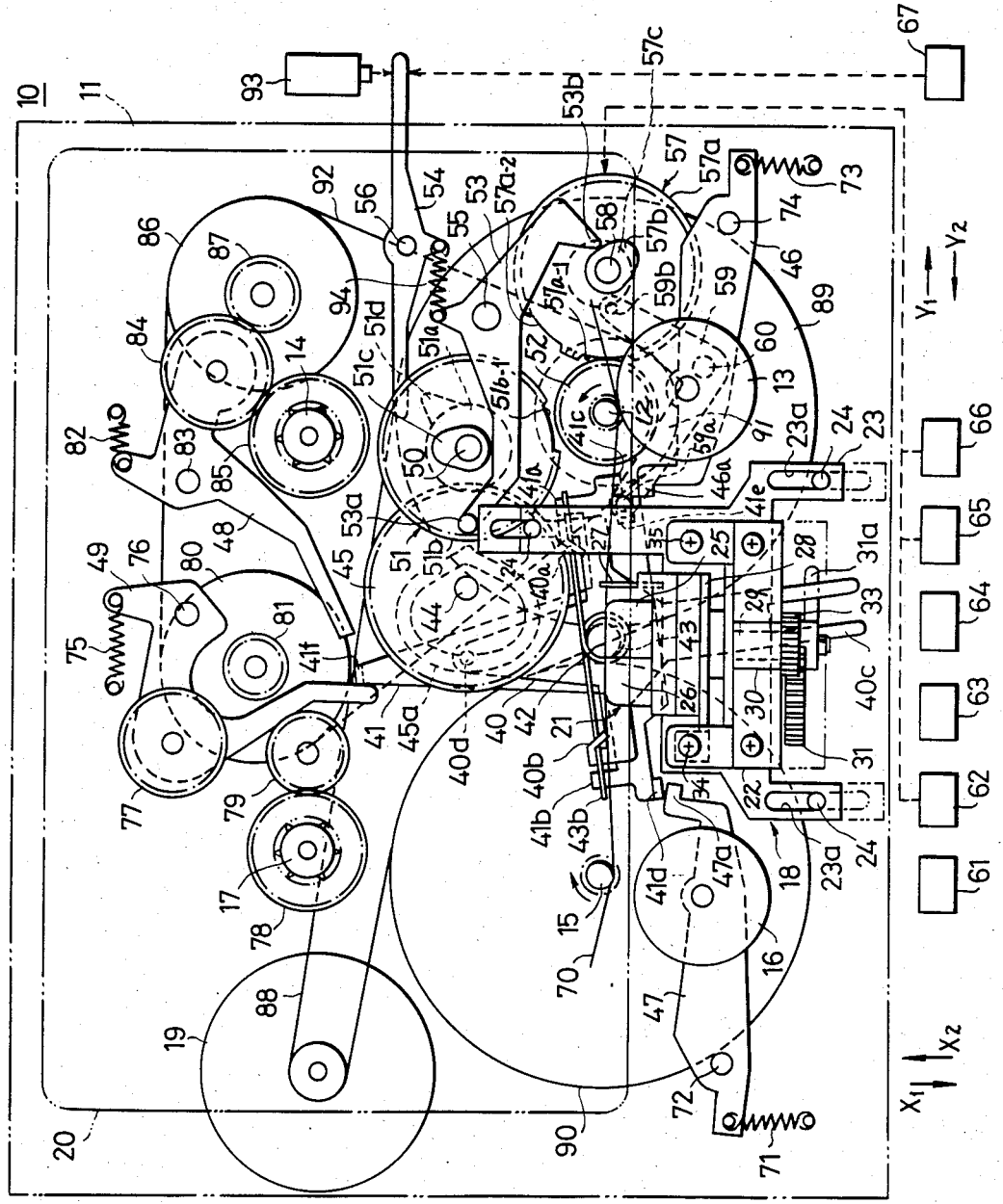
FIG. 1 is a plan view showing an embodiment of a tape recorder according to the present invention in a state where the tape recorder is in a forward reproduction mode.

In FIG. 1, a tape recorder 10 of the type in which the tape traveling direction is reversible, comprises a chassis base 11. A capstan 12 and a pinch roller 13 for moving the tape in a forward direction, and a take-up reel shaft 14, are respectively disposed in the right portion on the chassis base 11. On the other hand, a capstan 15 and a pinch roller 16 for moving the tape in a reverse direction, and a supply reel shaft 17, are respectively disposed in the left portion on the chassis base 11. Further, a magnetic head assembly 18 is disposed in the central portion on the chassis base 11. The tape recorder 10 also comprises a single motor 19. As will be described later on in the specification, this motor 19 is used as the driving source to move the tape and to rotate a magnetic head over one-half revolution. A tape cassette 20 which is loaded into the tape recorder 10, is indicated by a two-dot chain line in FIG. 1. As shown in FIG. 1, the capstans 12 and 15 and the reel shafts 14 and 17 are respectively inserted into the loaded tape cassette 20.

As shown in FIGS. 2 and 3, the magnetic head assembly 18 comprises a magnetic head structure 21, a head holder 22 which rotatably supports the magnetic head assembly 21, and a head base 23 on which the head holder 22 is fixedly mounted. The head base 23 has three elongated holes 23a. Hence, the magnetic head assembly 18 is movable in the directions of arrows X1 and X2, in a state where pins 24 on the chassis base 11 fit into the respective elongated holes 23a and guide the head base 23. In a stop mode of the tape recorder 10, the magnetic head assembly 18 is moved in the direction of the arrow X1 and assumes a position indicated by a two-dot chain line in FIG. 1.

The magnetic head structure 21 generally comprises a recording and reproducing magnetic head 25, an erasing magnetic head 26, a tape guide 27, and a rotary base 28. A shaft 29 located on the rear of the magnetic head structure 21, is rotatably supported by a bearing sleeve 30 of the head holder 22. A fan-shaped gear 31 is pivotally supported on the head holder 22 by a pin 32. The fan-shaped gear 31 meshes with a gear 33 which is fixed on the shaft 29, and has an arm 31a which extends downwardly. The magnetic head structure 21 rotates over 180° by rotating the fan-shaped gear 31. The magnetic head structure 21 can assume either one of two positions. In other words, the magnetic head structure 21 can assume a normal position shown in FIG. 2 where an arm 28a of the rotary base 28 engages with a stopper screw 34, or a rotated position where another arm 28b of the rotary base 28 engages with a stopper screw 35. The magnetic head structure 21 is rotated clockwise over 180° from the normal position shown in FIG. 2 to reach the rotated position.

As shown in FIG. 4, a substantially cross-shaped magnetic head rotating lever 40, and a substantially T-shaped rotary lever 41 for controlling the tape driving system, are respectively located in the central part on the lower surface of the chassis base 11. The head rotating lever 40 and the rotary lever 41 are coaxially supported on a pin 42 which is located on the chassis base 11. A torsion coil spring 43 is fitted over the pin 42, and has arm parts 43a and 43b respectively extending to the right and left thereof. The arm parts 43a and 43b of the torsion coil spring 43 engage with respective engaging parts 40a and 40b of the head rotating lever 40, and a relatively large spring force is accumulated by this arrangement. Tip end parts 43a-1 and 43b-1 of the respective arms 43a and 43b, extend outwardly from the respective engaging parts 40a and 40b and engage with respective engaging parts 41a and 41b of the rotary lever 41. Accordingly, the rotary lever 41 is coupled to the head rotating lever 40 through the torsion coil spring 43. Thus, the rotary lever 41 can follow the rotation of the head rotating lever 40 and rotate unitarily with the head rotating lever 40, and also rotate independently of the head rotating lever 40 against the force exerted by the torsion coil spring 43.

The head rotating lever 40 has a fork-shaped engaging part 40c on the tip end thereof extending in the direction of the arrow X1, and a guide pin 40d on the tip end thereof extending in the direction of the arrow X2. The engaging part 40c engages with an arm 31a of the fan-shaped gear 31. The guide pin 40d fits into a substantially oval cam groove 45a which is formed on the lower surface of a gear 45 at a position deviated from the center of the gear 45. This gear 45 is rotatably supported on a pin 44 which is located on the chassis base 11.

The rotary lever 41 further comprises engaging parts 41c and 41d located on the right and left sides thereof, a cutout 41e formed on the right side thereof, and an engaging part 41f located on the tip end thereof extending in the direction of the arrow X2 The engaging parts 41c and 41d engage with tip end parts 46a and 47a of respective pinch roller arms 46 and 47, and the engaging part 41f engages with reel levers 48 and 49.

The gear 45 meshes with a small diameter gear 51a of a first gear block 51 which is rotatably supported on a pin 50 on the chassis base 11. The number of teeth on the gears 45 and the number of teeth on the small diameter gear 51a, are selected so as to satisfy a ratio 2:1. In addition to the small diameter gear 51a, the first gear block 51 comprises a large diameter gear 51b having a teethless part 51b-1, a substantially oval cam 51c, and a projection 51d. The first gear block 51 is disposed at a position so that the large diameter gear 51b can mesh with a driving gear 52 which is unitarily provided on the capstan 12. A magnetic head moving lever 53 is pivotally supported on a pin 55 in relation to the cam 51c. Further, a tape traveling direction switchover lever 54 is pivotally supported on a pin 56, opposing the projection 51d. A pin 53a which engages with the tip end of the head base 23, is located on one end of the head moving lever 53. An intermediate part of the head moving lever 53 between the pins 55 and 53a, makes contact with the cam 51c.

A second gear block 57 is rotatably supported on a pin 58, opposing the driving gear 52. The second gear block 57 comprises a gear 57a having a pair of teethless parts 57a-1 and 57a-2, a substantially oval cam 57b which acts on a contact part 53b located on the other end of the head moving lever 53, and an eccentric cam 57c. An L-shaped control lever 59 is pivotally supported on a pin 60, in relation to the eccentric cam 57c. The control lever 59 comprises a pin 59a located on one end thereof, and a pin 59b located on the other end thereof. The pin 59a engages with the cutout 41e of the rotary lever 41, and the pin 59b makes contact with the eccentric cam 57c.

A stop button 61, a rewind button 62, a recording button 63, a play button 64, a fast-forward button 65, a pause button 66, and a direction button 67, are provided on the tape recorder 10 in this sequence from the left thereof.

Next, description will be given with respect to the operation of the tape recorder 10 having the construction described heretofore.

In a forward reproduction mode, the tape recorder 10 assumes a state shown in FIGS. 1 through 4. In other words, the magnetic head assembly 18 is moved in the direction of the arrow X2 to a final position, and the magnetic heads 25 and 26 are inserted into the tape cassette 20 through the central window of the tape cassette 20 so as to make contact with a magnetic tape 70. The teethless parts 51b-1 and 57a-1 of the respective first and second gear blocks 51 and 57 oppose the driving gear 52, and the capstan 12 is rotatable independently of the first and second gear blocks 51 and 57. The guide pin 40d of the head rotating lever 40 is guided by a part of the cam groove 45a in the vicinity of the outer peripheral part of the gear 45, and the head rotating lever 40 is accordingly rotated counterclockwise. Hence, the magnetic head structure 21 assumes the normal position shown in FIGS. 2 and 3. The rotary lever 41 is also rotated counterclockwise. The tip end part 47a of the pinch roller arm 47 is engaged by the engaging part 41d of the rotary lever 41, and the pinch roller arm 47 is rotated clockwise about a pin 72 against the force exerted by a spring 71. Thus, the pinch roller 16 is separated from the capstan 15. The other pinch roller arm 46 is not engaged by the engaging part 41c of the rotary lever 41. Therefore, the pinch roller arm 46 is rotated clockwise about a pin 74 by the action of a spring 73, and the pinch roller 13 is pressed against the capstan 12.

In addition, the reel lever 49 is engaged by the engaging part 41f of the rotary lever 41, and is rotated clockwise about a pin 76 against the force exerted by a spring 75. Hence, an intermediate gear 77 is separated from a gear 79 which meshes with a reel gear 78, and is also separated from a gear 81 which is integrally provided on a pulley 80. In other words, the supply reel shaft 17 is disengaged from the rotation transmitting system. The other reel lever 48 is rotated clockwise about a pin 83 by the action of a spring 82, and an intermediate gear 84 meshes with a gear 85 and gear 87 which is integrally provided on a pulley 86. Accordingly, the take-up reel shaft 14 is engaged with the rotation transmitting system, and a rotation transmitting path is formed with respect to the take-up reel shaft 14.

The motor 19 rotates counterclockwise. The rotation of the motor 19 is transmitted to right and left flywheels 89 and 90, through a belt 88, so that the right capstan 12 rotates counterclockwise and the left capstan 15 rotates clockwise. Further, the rotation of the capstan 12 is transmitted to the pulleys 80 and 86, through a pulley 91 which is integrally provided on the capstan 12 and a belt 92, so as to rotate the gears 81 and 87 counterclockwise. The take-up reel shaft 14 is lockwise through the intermediate gear 84 and the rotated counterclockwise through the intermediate gear 84 and the reel gear 85, to take up the tape 70.

The tape 70 is driven in a state where the tape 70 is pinched between the pinch roller 12 and the capstan 13, and the tape 70 moves at a constant speed in the forward direction indicated by an arrow Y1. The magnetic head 25 reproduces signals from forward tracks on the tape 70.

In a forward recording mode of the tape recorder 10, signals are recorded on the forward tracks on the tape 70 by the magnetic head 25.

Figure 5:
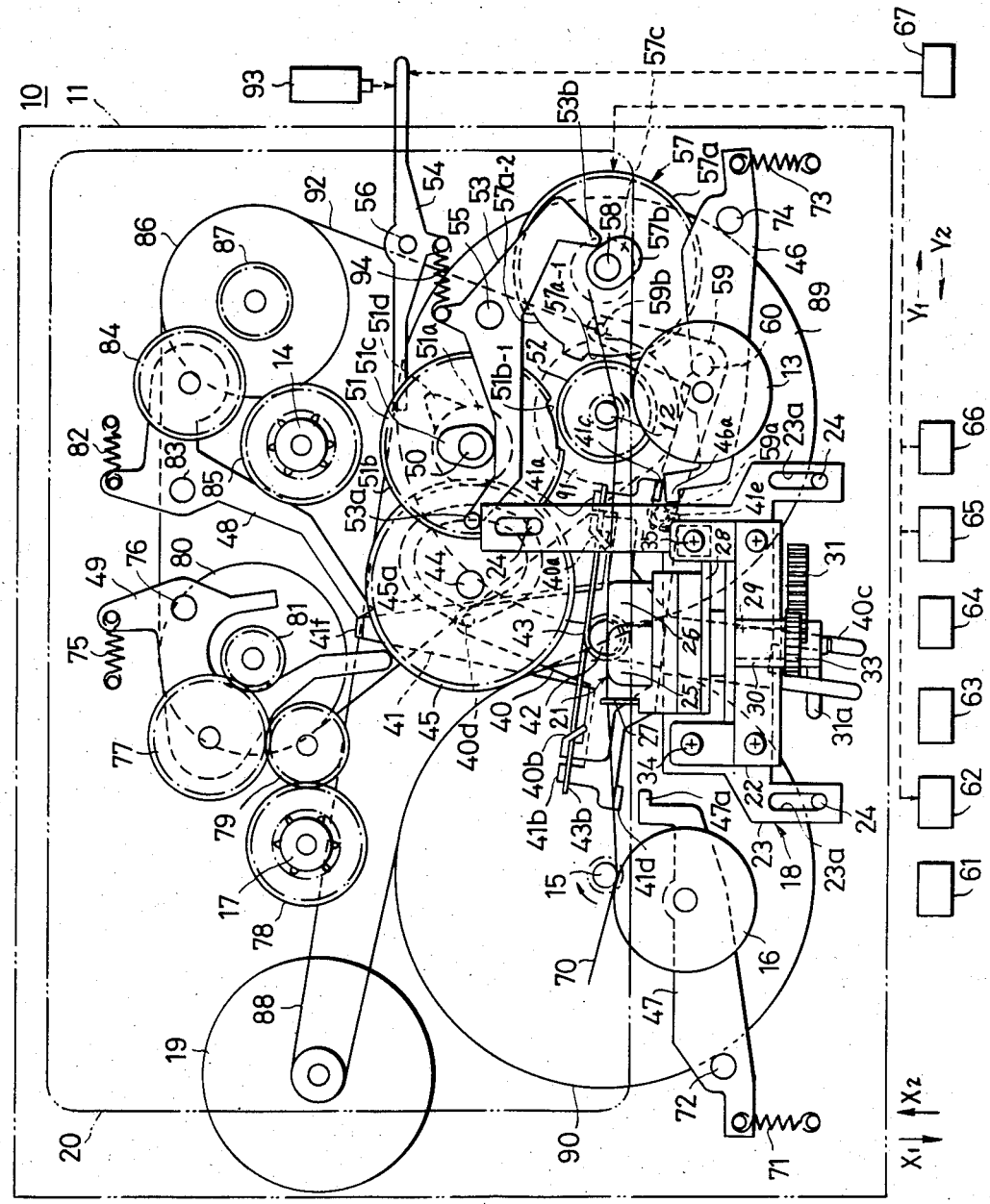
FIGS. 5 and 6 are plan views of the tape recorder according to the present invention in a state where the tape recorder is in a reverse reproduction mode and in a state where the tape recorder is in a fast-forward mode.

Next, description will be given with respect to the operation of switching over the mode of the tape recorder 10 from the forward reproducing mode to a reverse reproducing mode, by referring to FIG. 5.

When the end of the tape 70 is detected while the tape 70 is moving in the forward direction, a plunger 93 operates temporarily. Thus, the switchover lever 54 rotates counterclockwise against the force exerted by a spring 94, and kicks the projection 51d of the first gear block 51. As a result, the first gear block 51 starts to operate, and the large diameter gear 51b meshes with the driving gear 52. The first gear block 51 is thereafter driven by the driving gear 52, and rotates clockwise over one revolution until the teethless part 51b-1 again opposes the driving gear 52.

During the first half of the rotation of the first gear block 51, the head moving lever 53 is pushed by the cam 51c and is moved counterclockwise against the force exerted by the spring 94. Hence, the head moving lever 53 pushes back the magnetic head assembly 18 by the pin 53a, in the direction of the arrow X1 against the force exerted by a spring (not shown), up to a position indicated by a two-dot chain line in FIG. 1. Then, during the second half of the rotation of the first gear block 51, the head moving lever 53 returns by rotating clockwise, and the magnetic head assembly 18 is advanced in the direction of the arrow X2 up to a position shown in FIG. 5.

As the first gear block 51 undergoes one revolution, the gear 45 rotates counterclockwise and undergoes one-half revolution. In this state, the guide pin 40d is guided by the cam groove 45a and moves towards the center of the gear 45, and the head rotating lever 40 rotates clockwise. Due to the clockwise rotation of the head rotating lever 40, the fan-shaped gear 31 is engaged by the engaging part 40c of the head rotating lever 40. As a result, the fan-shaped gear 31 rotates clockwise in FIGS. 3 and 4, and the magnetic head structure 21 rotates clockwise in FIG. 2. The magnetic head structure 21 rotates clockwise to the final position by the action of a spring, at a point when the fan-shaped gear 31 rotates halfway. In other words, the magnetic head structure 21 undergoes one-half revolution, and assumes a state where the arm 28b is engaged and stopped by the stopper screw 35.

The magnetic head structure 21 undergoes the one-half revolution in a state where the magnetic heads 25 and 26 and the tape guide 27 have come out of the tape cassette 20 through the central window of the tape cassette 20, and then enters into the tape cassette 20 through the central window to make contact with the tape 70.

The rotary lever 41 rotates clockwise, unitarily with the head rotating lever 40, due to the action of the torsion coil spring 43. As the rotary lever 41 rotates clockwise, the reel lever 48 is engaged by the engaging part 41f of the rotary lever 41 and is rotated counterclockwise. The intermediate gear 84 separates from the reel gear 85 and the gear 87, and the rotation transmitting path with respect to the take-up reel shaft 14 is disconnected. In addition, the other reel lever 49 is disengaged from the engaging part 41f and is rotated clockwise. Thus, the intermediate gear 77 meshes with the gears 79 and 81, so as to form a rotation transmitting path with respect to the supply reel shaft 17. The supply reel shaft 17 is hence rotated clockwise.

Moreover, as the rotary lever 41 rotates clockwise, the pinch roller arm 46 is engaged by the engaging part 41c of the rotary lever 41 and is rotated counterclockwise. As a result, the pinch roller 13 separates from the capstan 12. The other pinch roller arm 47 is disengaged from the engaging part 41d of the rotary arm 41, and is rotated counterclockwise by the action of the spring 71. Hence, the pinch roller 16 presses against the capstan 15.

Accordingly, in the tape recorder 10, the tape 70 is driven in a state where the tape 70 is pinched between the pinch roller 16 and the capstan 15, and the tape 70 moves at a constant speed in the reverse direction indicated by an arrow Y2. The moving tape 70 is taken up by the supply reel shaft 17. Therefore, the tape recorder 10 assumes the reverse reproduction mode in which the magnetic head 25 reproduces signals from reverse tracks on the tape 70.

Even in a case where the direction button 67 is pushed during the forward reproduction mode, the switchover lever 54 is rotated counterclockwise by this pushing of the direction button 67. Thus, the tape recorder 10 operates similarly as described before, and the mode of the tape recorder 10 is changed to the reverse reproduction mode.

When the plunger 93 operates or the direction switch 67 is pushed during the reverse reproduction mode, the first gear block 51 is operated and undergoes one revolution. Further, the gear 45 undergoes a one-half revolution, and the levers 40 and 41 rotationally return by rotating counterclockwise. As a result, the magnetic head structure 21 undergoes a one-half revolution and assumes the normal position shown in FIG. 2, and the take-up reel shaft 14 is rotated instead of the supply reel shaft 17. The pinch roller 16 separates from the capstan 15, and the pinch roller 13 presses against the capstan 12. The tape recorder 10 thus assumes the forward reproduction mode shown in FIG. 1.

Next, description will be given with respect to the operation of switching over the mode of the tape recorder 10 from the forward reproduction mode to a fast-forward mode, by referring to FIG. 6.

When the fast-forward button 65 is pushed during the forward reproduction mode shown in FIG. 1, the second gear block 57 is operated, and the gear 57a meshes with the driving gear 52. Thereafter, the second gear block 57 is driven by the driving gear 52, and is rotated clockwise over approximately 5/6 revolution until the teethless part 57a-2 opposes the driving gear 52.

In this state, the head moving lever 53 is pushed by the cam 57b of the second gear block 57, and is rotated counterclockwise. Hence, the head moving lever 53 pushes back the magnetic head assembly 18 in the direction of the arrow X1. The magnetic head structure 21 does not rotate. Accordingly, it is unnecessary to cause the magnetic head assembly 18 to assume the receded position where the magnetic heads 25 and 26 are completely outside the tape cassette 20. For this reason, the magnetic head assembly 18 is moved over a distance which is shorter than the moving distance thereof when the mode of the tape recorder 10 is changed between the forward reproduction mode and the reverse reproduction mode as described before. The magnetic head assembly 18 recedes up to the position shown in FIG. 6, and the magnetic heads 25 and 26 separate from the tape 70.

In addition, the control lever 59 is pushed by the eccentric cam 57c of the second gear block 57, and is rotated counterclockwise. The control lever 59 rotates the rotary lever 41 clockwise. In this state, the guide pin 40d of the head rotating lever 40 fits into the cam groove 45a, and the rotational position of the head rotating lever 40 is restricted. Accordingly, the engaging part 41a of the rotary lever 41 engages with the arm part 43a of the torsion coil spring 43 and resiliently deforms the arm part 43a, and the rotary lever 41 rotates independently of the head rotating lever 40. The rotary lever 41 stops at an intermediate rotational position between the rotational position shown in FIG. 1 and the rotational position shown in FIG. 5.

Thus, the pinch roller arms 46 and 47 are engaged by the respective engaging parts 41c and 41d of the rotary lever 41, and the pinch rollers 13 and 16 separate from the respective capstans 12 and 15. The reel levers 48 and 49 are engaged by the engaging part 41f of the rotary lever 41, and the intermediate gear 77 separates from the gears 79 and 81. On the other hand, the intermediate gear 84 separates from the gears 85 and 87. Consequently, the rotation transmitting path is disconnected with respect to both the supply reel shaft 17 and the take-up reel shaft 14.

The take-up reel shaft 14 is rotated in the tape take-up direction by a motor (not shown), and the tape recorder 10 assumes the fast-forward mode in which the tape 70 is moved in the forward direction at a fast speed.

Even in a case where the rewind button 62 is pushed during the forward reproduction mode, the second gear block 57 is operated, and the tape recorder 10 operates similarly as described heretofore to assume a rewind mode, except that the supply reel shaft 17 is rotated in the tape rewind direction by a motor (not shown) in this case.

Figure 6:
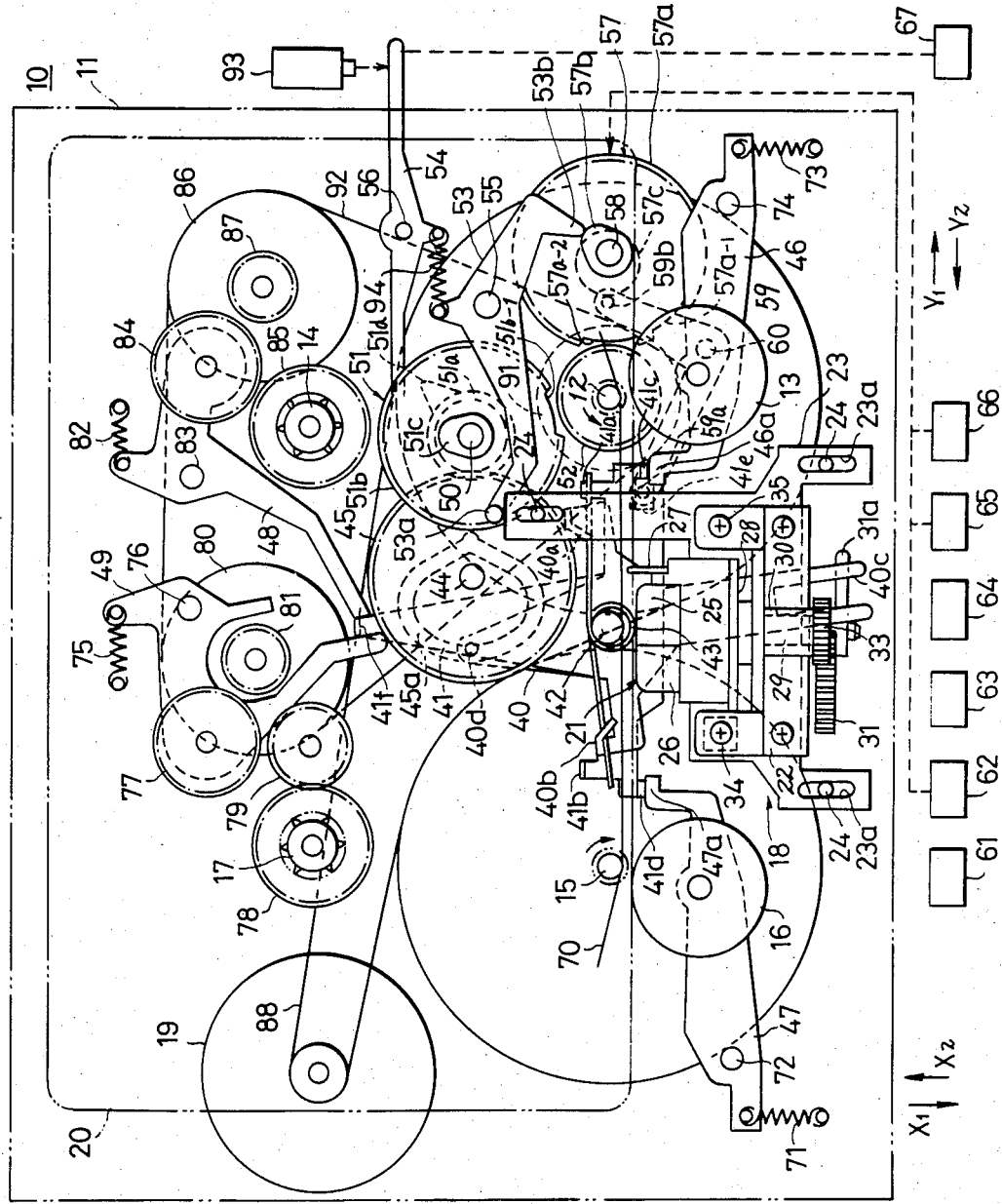

In a case where the pause button 66 is pushed during the forward reproduction mode, the second gear block 57 is operated and the tape recorder 10 assumes the state shown in FIG. 6. In this case, the tape recorder 10 assumes a pause mode in which the reel shafts 14 and 17 do not rotate.

Further, the present invention is not limited to these embodiments, but various variations and modifications may be made without departing from the scope of the present invention.

What is claimed is:

1. A tape recorder having an improved system for controlling tape travel and magnetic head movement, said tape recorder playing a tape cassette which accommodates a tape and is loaded into said tape recorder in a mode which is selected out of a forward reproduction mode in which a reproduction is carried out while the tape moves in a forward direction, a reverse reproduction mode in which the reproduction is carried out while the tape moves in a reverse direction, and a third mode other than the forward and reverse reproduction modes, said tape recorder comprising:
   a first pinch roller mechanism for pressing against a first capstan and for moving the tape in the forward direction during said forward reproduction mode;
   a second pinch roller mechanism for pressing against a second capstan and for moving the tape in the reverse direction during the reverse reproduction mode;
   a magnetic head mechanism having a magnetic head for rotating the magnetic head over one-half revolution in response to a reversal of the tape traveling direction, said magnetic head assuming first rotational position of the magnetic head when said tape moves in the forward direction and assuming a second rotational position of the magnetic head when said tape moves in the reverse direction;
   control means for selectively operating said first pinch roller mechanism or said second pinch roller mechanism responsive to said mode, and for operating said magnetic head mechanism, said control means comprising a first rotary lever for operating said magnetic head mechanism so as to determine a rotational position of the magnetic head by rotating the magnetic head over one-half revolution responsive to a rotational position of the first rotary lever, first rotating means for rotating said first rotary lever, a second rotary lever coupled to said first rotary lever through a resilient member, said second rotary lever rotating together with said first rotary lever so as to assume one of first and second rotational positons of said second rotary lever depending on the rotational position of said first rotary lever, said first and second rotary levers having a common rotary axis, and second rotating means for deforming said resilient member and for rotating said second rotary lever to a third rotational position separately from said first rotary lever during said third mode, said first rotating means comprising a cam part for engaging with a part of said first rotary lever so as to determine said rotational position of said first rotary lever depending on the mode of said tape recorder; and
   driving means for driving said cam part of said first rotating means,
   said second rotary lever making it possible to transmit a rotation to a take-up reel shaft, making said first pinch roller mechanism operative, and making said second pinch roller mechanism inoperative in said first rotational position of said second rotary lever,
   said second rotary lever making it possible to transmit a rotation to a supply reel shaft, making said second pinch roller mechanism operative, and making said first pinch roller mechanism inoperative in said second rotational position of said second rotary lever,
   said second rotary lever making it impossible to transmit a rotation to said take-up reel shaft and said supply reel shaft, and making said first and second pinch roller mechanisms inoperative in said third rotational position of said second rotary lever.

2. A tape recorder as claimed in claim 1 in which said driving means comprises a single motor, and said tape recorder further comprises a first belt means for transmitting a rotation of said motor to said first and second capstans so that said first and second capstans rotate in mutually opposite directions, and a second belt means for transmitting the rotation of said motor to said take-up reel shaft and said supply reel shaft.

3. A tape recorder as claimed in claim 1 in which said driving means comprises a single motor, said first rotating means comprises a first gear block rotated by said motor, and a gear body meshing with a gear of said first gear block, said cam part of said first rotating means comprises a cam groove which is formed on said gear body and fitted by the part of said first rotary lever therein, and said second rotating means comprises a second gear block rotated by said motor, and an eccentric cam engaged with said second rotary lever, for rotating said second rotary lever.

4. A tape recorder as claimed in claim 3 in which said first gear block comprises a gear having a teethless part, said first gear block rotates in terms of one rotation from a position where said teethless part opposes a driving gear which is rotated by said motor until said teethless part again opposes said driving gear, a ratio between a number of teeth of said gear body and a number of teeth of said gear having the teethless part is 2:1, said gear body rotates in terms of one-half revolution, and said first rotary lever undergoes a reciprocating rotary movement responsive to first and second one-half revolutions of said gear body.

5. A tape recorder as claimed in claim 4 in which said first gear block comprises a first cam for moving the magnetic head when said mode is changed so that the magnetic head recedes and separates from said tape, and said magnetic head separates from said tape before said magnetic head starts to undergo a one-half revolution.

6. A tape recorder as claimed in claim 3 in which said first gear block comprises a first cam for moving the magnetic head when said mode is changed so that the magnetic head recedes and separates from said tape, and said second gear block comprises a second cam for moving the magnetic head so that the magnetic head recedes when said mode is changed.

7. A tape recorder as claimed in claim 1 in which said first rotary lever and said second rotary lever are coaxially supported on a common shaft, and said resilient member comprises a torsion coil spring which is fitted over said shaft.

8. A tape recorder as claimed in claim 1 in which said first rotary lever has a substantially cross-shape and comprises three engaging parts, one of said three engaging parts being located on one end of an arm of said first rotary lever extending vertically in a plan view and engaging with said magnetic head mechanism, and two remaining engaging parts of said three engaging parts being located on respective arms of said first rotary lever extending horizontally in the plan view and engaging with said resilient member.

9. A tape recorder as claimed in claim 1 in which said second rotary lever has a substantially T-shape and comprises three engaging parts, two of said three engaging parts being located on respective arms of said second rotary lever extending horizontally in a plan view and respectively engaging with said first and second pinch roller mechanisms, and one remaining engaging part of said three engaging parts being located on an arm of said second rotary lever extending vertically in the plan view and controlling engagement and disengagement of a rotation transmitting path with respect to said supply reel shaft and said take-up reel shaft.

* * * * *